US012711395B2

(12) United States Patent
Zhu et al.

(10) Patent No.: US 12,711,395 B2
(45) Date of Patent: Aug. 18, 2026

(54) SYSTEM AND METHOD OF FEDERATED LEARNING WITH DIVERSIFIED FEEDBACK

(71) Applicant: Huawei Technologies Co., Ltd., Shenzhen (CN)

(72) Inventors: Yingxuan Zhu, Plano, TX (US); Jialing Wu, Plano, TX (US); Han Su, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 588 days.

(21) Appl. No.: 18/336,895

(22) Filed: Jun. 16, 2023

(65) Prior Publication Data

US 2023/0385652 A1 Nov. 30, 2023

Related U.S. Application Data

(63) Continuation of application No. PCT/US2020/066436, filed on Dec. 21, 2020.

(51) Int. Cl.
*G06N 3/098* (2023.01)

(52) U.S. Cl.
CPC .................................... *G06N 3/098* (2023.01)

(58) Field of Classification Search
CPC ...................................................... G06N 3/098
See application file for complete search history.

(56) References Cited

U.S. PATENT DOCUMENTS

2015/0324686 A1* 11/2015 Julian ...................... G06N 3/08 706/25
2016/0380826 A1* 12/2016 Pappu .................. H04L 47/808 370/253
2019/0042937 A1* 2/2019 Sheller ..................... G06N 3/08
2020/0125949 A1* 4/2020 Hechtman ................ G06N 3/09
2020/0334524 A1* 10/2020 Sprague ................. G06N 3/094

OTHER PUBLICATIONS

Machine Learning with Adversaries: Byzantine Tolerant Gradient Descent (Year: 2017).*
Jiyue Huang, et al., "An Exploratory Analysis on Users' Contributions in Federated Learning," arxiv.org, Cornell University Library, XP081813251, Nov. 13, 2020, 10 pages.

(Continued)

*Primary Examiner* — Christopher E Dunay
(74) *Attorney, Agent, or Firm* — Conley Rose, P.C.

(57) ABSTRACT

The present technology discloses a federated learning network including a server and multiple client devices. The server receives a set of parameters of a local machine-learning model from each client device in a subset of the multiple client devices. The set of parameters are combined from each of the client devices in the subset to generate an integrated set of parameters. The server then calculates a parameter difference between the integrated set of parameters and the set of parameters for each client device in the subset. Feedback is sent by the server to each client device in the subset. The feedback is applied during backpropagation of the client. If the local parameters of a client are determined to be invalid for a number of times, the client will be set as an outlier.

21 Claims, 8 Drawing Sheets

(56) References Cited

OTHER PUBLICATIONS

Jing Yang, et al., "Effective Neural Network Ensemble Approach for Improving Generalization Performance," IEEE Transactions on Neural Networks and Learning Systems, vol. 24, No. 6, XP011499472, Jun. 2013, 10 pages.
Fan Lai, et al., "Oort: Informed Participant Selection for Scalable Federated Learning," Cornell University Library, XP081785016, Oct. 13, 2020, 20 pages.
Nuria Rodriguez-Barroso, et al., "Dynamic Federated Learning Model for Identifying Adversarial Clients," Cornell University Library, XP081729246, Jul. 29, 2020, 13 pages.

* cited by examiner

SYSTEM AND METHOD OF FEDERATED LEARNING WITH DIVERSIFIED FEEDBACK

CROSS-REFERENCE TO RELATED APPLICATIONS

This patent application is a continuation of International Application No. PCT/US2020/066436 filed on Dec. 21, 2020, by Futurewei Technologies, Inc., and titled "System and Method of Federated Learning with Diversified Feedback," which is hereby incorporated by reference.

TECHNICAL FIELD

This disclosure generally relates to federated learning.

BACKGROUND

Machine learning has gradually made its way into many day-to-day applications. Due to the widespread use of machine-learning technologies, deployed machine learning models are often extensively trained. Training allows machine learning systems to provide accurate results on a large set of inputs. In particular, a large training dataset is needed to obtain an accurate and versatile model for the machine learning system.

Machine learning algorithms typically rely on training data being directly and centrally accessible. Therefore, the entity which effectively operates the model training has access to every training sample. Therefore, most machine learning as a service application which benefit from user's own data (to enrich the training dataset) explicitly demands users to reveal/expose their data. This produces an inherent tension between functionality and privacy.

Systems that attempt to federate the machine learning process by allowing the training process to be performed in a distributed manner, without the need of centralizing private data, suffer from the amount of time it takes for convergence of the data because data from different clients generally do not follow the same distribution.

SUMMARY

According to one aspect of the present disclosure, there is a computer-implemented method for federated learning in a network including a server and multiple client devices, comprising receiving, by the server, a set of parameters of a local machine-learning model from each client device in a subset of the multiple client devices; combining, by the server, the set of parameters from each of the client devices in the subset to generate an integrated set of parameters; determining, by the server, whether the set of parameters from each of the client devices in the subset of multiple client devices are valid according to a Central Limit Theorem; calculating, by the server, a parameter difference between the integrated set of parameters and the set of parameters for each client device in the subset of the multiple client devices; and sending, by the server, feedback to each client device in the subset of multiple client devices, the feedback based on a comparison of the parameter difference of each client device in the subset of the multiple devices to a first threshold value.

Optionally, in any of the preceding aspects, the method further comprising removing, by the server, an invalid set of parameters from the integrated set of parameters, the invalid set of parameters being determined to be invalid using the Central Limit Theorem.

Optionally, in any of the preceding aspects, the method further comprising calculating, by the server, the first threshold value using a normal distribution based on the Central Limit Theorem; and calculating, by the server, the parameter difference to the first threshold value.

Optionally, in any of the preceding aspects, wherein the feedback includes the integrated set of parameters, a normal distribution of the parameter difference and the parameter difference when the parameter difference is less than or equal to the first threshold value.

Optionally, in any of the preceding aspects, wherein the feedback is proportional to a standard deviation of the normal distribution.

Optionally, in any of the preceding aspects, wherein when the parameter difference is greater than the first threshold value, the method further comprising recording, by the server, a number of times the parameter difference for each of the client devices in the subset is greater than the first threshold value; sending; by the server, the parameter difference to each of the client devices in the subset; removing, by the server, the set of parameters for each of the client devices in the subset when the number of times is greater than a second threshold value, and recalculating, by the server, the integrated set of parameters to generate a recalculated integer set of parameters; and recalculating the parameter difference between the recalculated integrated set of parameters and the set of parameters for each client device in the subset of the multiple client devices.

Optionally, in any of the preceding aspects, the method further comprising setting, by the server, a particular client device as an outlier if the number of times is greater than the second threshold value; and removing, by the server, the outlier client device from the subset.

Optionally, in any of the preceding aspects, wherein the setting includes determining the outlier based on the normal distribution and the first threshold value.

Optionally, in any of the preceding aspects, the method further comprising storing a global machine-learning model at the server; and iteratively updating, by the server, the global machine-learning model based on the set of parameters received from each of the client devices in the subset of the multiple client devices.

According to one aspect of the present disclosure, there is a server for federated learning in a network having multiple client devices, comprising a non-transitory memory storage comprising instructions; and one or more processors in communication with the memory, wherein the one or more processors execute the instructions to receive a set of parameters of a local machine-learning model from each client device in a subset of the multiple client devices; combine the set of parameters from each of the client devices in the subset to generate an integrated set of parameters; determine, by the server, whether the set of parameters from each of the client devices in the subset of multiple client devices are valid according to a Central Limit Theorem; calculate a parameter difference between the integrated set of parameters and the set of parameters for each client device in the subset of the multiple client devices; and send feedback to each client device in the subset of multiple client devices, the feedback based on a comparison of the parameter difference of each client device in the subset of the multiple devices to a first threshold value.

According to one aspect of the present disclosure, there is a non-transitory computer-readable medium storing computer instructions for federated learning in a network including a server and multiple client devices, that when executed by one or more processors, causes the server to perform the steps of receiving a set of parameters of a local machine-learning model from each client device in a subset of the multiple client devices; combining the set of parameters from each of the client devices in the subset to generate an integrated set of parameters; determining, by the server, whether the set of parameters from each of the client devices in the subset of multiple client devices are valid according to a Central Limit Theorem; calculating a parameter difference between the integrated set of parameters and the set of parameters for each client device in the subset of the multiple client devices; and sending feedback to each client device in the subset of multiple client devices, the feedback based on a comparison of the parameter difference of each client device in the subset of the multiple devices to a first threshold value.

According to one aspect of the present disclosure, there is a computer-implemented method for federated learning in a network including a server and multiple client devices, comprising receiving, by a client device, feedback from the server, the feedback including at least one of an integrated set of parameters and a parameter difference, determining, by the client device, whether local parameters of the client device previously sent to the server are valid based on the received feedback; calculating, by the client device, a diversified set of parameters based on the integrated set of parameters, the parameter difference and the local parameters when the local parameters are determined to be valid; training, by the client device, a local machine-learning model based on the feedback and the diversified set of parameters calculated by the client device when the local parameters are determined to be valid; retrieving, by the client device, updated local parameters from the trained local machine-leaning model; and sending, by the client device, the updated local parameters to the server.

Optionally, in any of the preceding aspects, wherein when the local parameters are determined to be invalid, further comprising selecting, by the client device, one parameter of the integrated parameters, the local parameters of the client device previously sent to the server or a new set of parameters based on data collected by the client device; and training, by the client device, the local machine-learning model based on the feedback from the server and the selected one parameter of the integrated parameters, the local parameters of the client device previously sent to the server, or the new set of parameters.

Optionally, in any of the preceding aspects, wherein when the local parameters are determined to be invalid, further comprising classifying the client device as an outlier.

Optionally, in any of the preceding aspects, the method further comprising calculating the diversified set of parameters based on the integrated set of parameters, the parameter difference, and local parameters.

Optionally, in any of the preceding aspects, wherein the local parameters of the client device are determined to be valid when a difference between the integrated set of parameters and the local parameters of the client device previously sent to the server are less than or equal to a first threshold value, and the local parameters of the client device are determined to be invalid when a difference between the integrated set of parameters and the local parameters of the client device previously sent to the server are greater than a first threshold value.

Optionally, in any of the preceding aspects, the method further comprising identifying a number of times the parameter difference and the local parameters are invalid from the feedback sent by the server.

Optionally, in any of the preceding aspects, when the number is greater than a second first threshold, further comprising setting the client device as an outlier.

Optionally, in any of the preceding aspects, wherein the integrated set of parameters received from the server includes a combination of local parameters from a subset of the multiple client devices, and the parameter difference is the difference between the integrated set of parameters and the local parameters from the client device previously sent to the server.

Optionally, in any of the preceding aspects, wherein the local parameters are collected by the client device.

According to one aspect of the present disclosure, there is a client device for federated learning in a network, comprising a non-transitory memory storage comprising instructions; and one or more processors in communication with the memory, wherein the one or more processors execute the instructions to receive feedback from a server in the network, the feedback including at least one of an integrated set of parameters and a parameter difference, determine whether local parameters of the client device previously sent to the server are valid based on the received feedback; calculate a diversified set of parameters based on the integrated set of parameters, the parameter difference and the local parameters when the local parameters are determined to be valid; train a local machine-learning model based on the feedback and the diversified set of parameters calculated by the client device when the local parameters are determined to be valid, retrieve updated local parameters from the trained local machine-learning model; and send the updated local parameters to the server.

According to one aspect of the present disclosure, there is a non-transitory computer-readable medium storing computer instructions for federated learning in a network including a server and multiple client devices, that when executed by one or more processors, causes a client device to perform the steps of receiving feedback from the server, the feedback including at least one of an integrated set of parameters and a parameter difference, determining whether local parameters of the client device previously sent to the server are valid based on the received feedback; calculating a diversified set of parameters based on the integrated set of parameters, the parameter difference, and the local parameters when the local parameters are determined to be valid; training a local machine-leaning model based on the feedback and the diversified set of parameters calculated by the client device when the local parameters are determined to be valid: retrieving updated local parameters from the trained local machine-learning model; and sending the updated local parameters to the server.

This Summary is provided to introduce a selection of concepts in a simplified form that are further described below in the Detailed Description. This Summary is not Intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
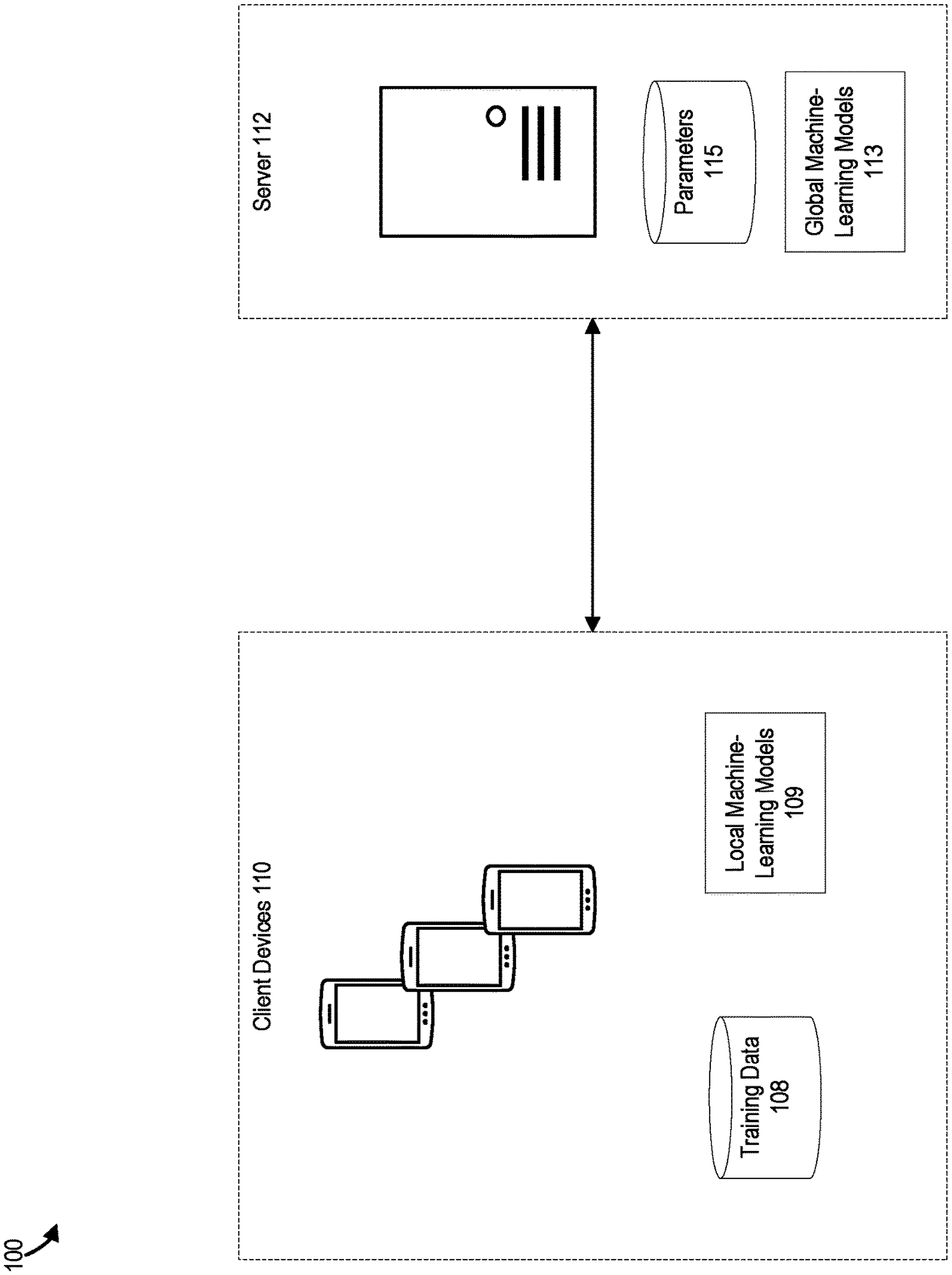
FIG. 1 illustrates an example system for training one or more machine learning models.

The present disclosure will now be described with reference to the figures, which generally relate to transmission of data in a network.

Federated learning enables a machine learning model to be trained using data across many edge or client devices without having to centralize the data used for training. These client devices perform local training, and provide training results to an aggregator device, such as a server, which aggregates or combines the training results among the multiple client devices to update a machine-learning model. Results of the training (the updates) can then be re-distributed or fed back to the client devices for subsequent training and/or use. Such a federated learning approach facilitates many advantages such as bandwidth conservation (training data is present at the client device) and privacy (client device training data is not distributed). Consequently, the word "federated" as used herein means that multiple devices cooperate in learning, including one or more client devices. Further, the word federated means that multiple devices can cooperate in building a machine learning model or models, and the devices use the model or models in the learning process. Here, the federated client devices can include some or all of the multiple client devices.

In the disclosed technology, after the server receives the training results (e.g., parameters of a local machine-learning model) from the client devices, the server combines or aggregates the training results from the client devices into an integrated or public set of results (e.g., integrated set of parameters). The differences between the training results of each client device is compared to the integrated set of results and feedback is provided to the client devices, without collecting any additional data from the client devices. In one embodiment, client devices with training results that are determined to be outliers are removed from providing further training results to the server. Applying these techniques, the effect of data divergence is minimized and the number of rounds or iterations to achieve convergence of the data is reduced.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates an example system for training one or more machine learning models. The system 100 includes client devices 110 and server 112 as part of a federated learning system. The server 112 and clients 110 can be part of a system-wide machine learning model. In some implementations, the server 112 can become a client device 110, and a client device 110 can become a server 112. Client devices 110 includes a database storing training data 108 and a local machine-learning model 109. In one embodiment, the training data 108 is collected by individual client devices 110 and stored locally (local data or local dataset). In some implementations, system 100 can include more than one server 112. The server 112 can be configured to access data from each of the local machine-learning models 109 of a respective client device 110. For example, the server 112 may access data parameters of a local machine-learning model 109 trained by a client device 110. Local machine-learning model 109 can be, for instance, a linear regression model, logistic regression model, a support vector machine model, a neural network (e.g., convolutional neural network, recurrent neural network, etc.), or any other type of machine-leaning model. In some implementations, the server 112 can be configured to communicate with client computing devices 110 over one or more networks (not shown).

Client computing devices 110 can each be configured to determine one or more local updates associated with the local machine-learning model 109 based at least in part on training data 108. For instance, training data 108 can be data that is respectively stored locally on the client devices 110. The training data 108 can include audio files, image files, video files, a typing history, location history, and/or various other suitable data. In some implementations, the training data 108 can be any data derived through a user interaction with a client computing device 110. As appreciated, the training data 108 is stored in a database or in memory at each of the client devices 110. Thus, the training data 108 at each of the client devices 110 is collected independently at each client device. In one embodiment, the client devices 110 may form a group or network of client devices 110 in which to share some or all of the training data 108.

In one embodiment, the client devices 110 can be configured to provide data to the server 112. In one embodiment, the data provided to the server 112 does not include private data. As explained below in more detail, the client devices 110 may provide parameter data and updates to the server 112. Such data may include data parameters that are collected or obtained from the local machine-learning model 109 at each of the client devices 110. In one embodiment, the data sent to the server 112 does not include training data or other private data collected or obtained by the client device 110 in order to preserve the privacy of such data. In some implementations, one or more encryption techniques and/or other security techniques can be added to the training data in order to ensure that the data are obscured and that any inferable information is removed. In another embodiment, each of the client devices 110 uses the same machine-learning model (or algorithm) in which to process local datasets to train the model.

The server 112 can receive data from each of the client devices 110. Data received from the client devices 110 can be stored in a database, such as database 115, for processing. In one embodiment, the received data is network parameter data (or parameters) calculated by the local machine-learning model 109 based on local training data 108 for each of the client devices 110. In a further embodiment, the received network parameter data from each of the client devices 110 is combined or aggregated to form an integrated dataset (or public parameter). The integrated parameter may be updated during each iteration of data received from the client devices 110. In some implementations, the server 112 collects the network parameter data from the client devices 110. The server 112 calculates the integrated parameter and determines the mean of the differences from each of the client devices 110 to a normal distribution, as explained below, to generate a single mean difference for all of the client devices. The information (e.g., integrated parameter) may then be sent back to the client devices 110 for further processing and backpropagation by local machine-learning model 109.

In a further embodiment, the server 112 includes a global machine-learning model (or models) 113. The global machine-learning model 113 can be part of the machine-learning system that consists of the server 112 and clients 110 (e.g., server and clients can both be part of a machine learning model). For example, if server 112 and clients 110 form a convolutional neural network (CNN), then clients 110 consist of layers in the lower level of the CNN and the server 112 consists of the layers in the upper level. In this case, the server 112 and clients 110 may work together to accomplish a training goal. In one embodiment, the global machine-learning model 113 may be trained using data received from the client devices 110. Similar to the local machine-learning model 109, the model can be a linear regression model, logistic regression model, a support vector machine model, a neural network (e.g., convolutional neural network, recurrent neural network, etc.), or other suitable models.

Figure 2:
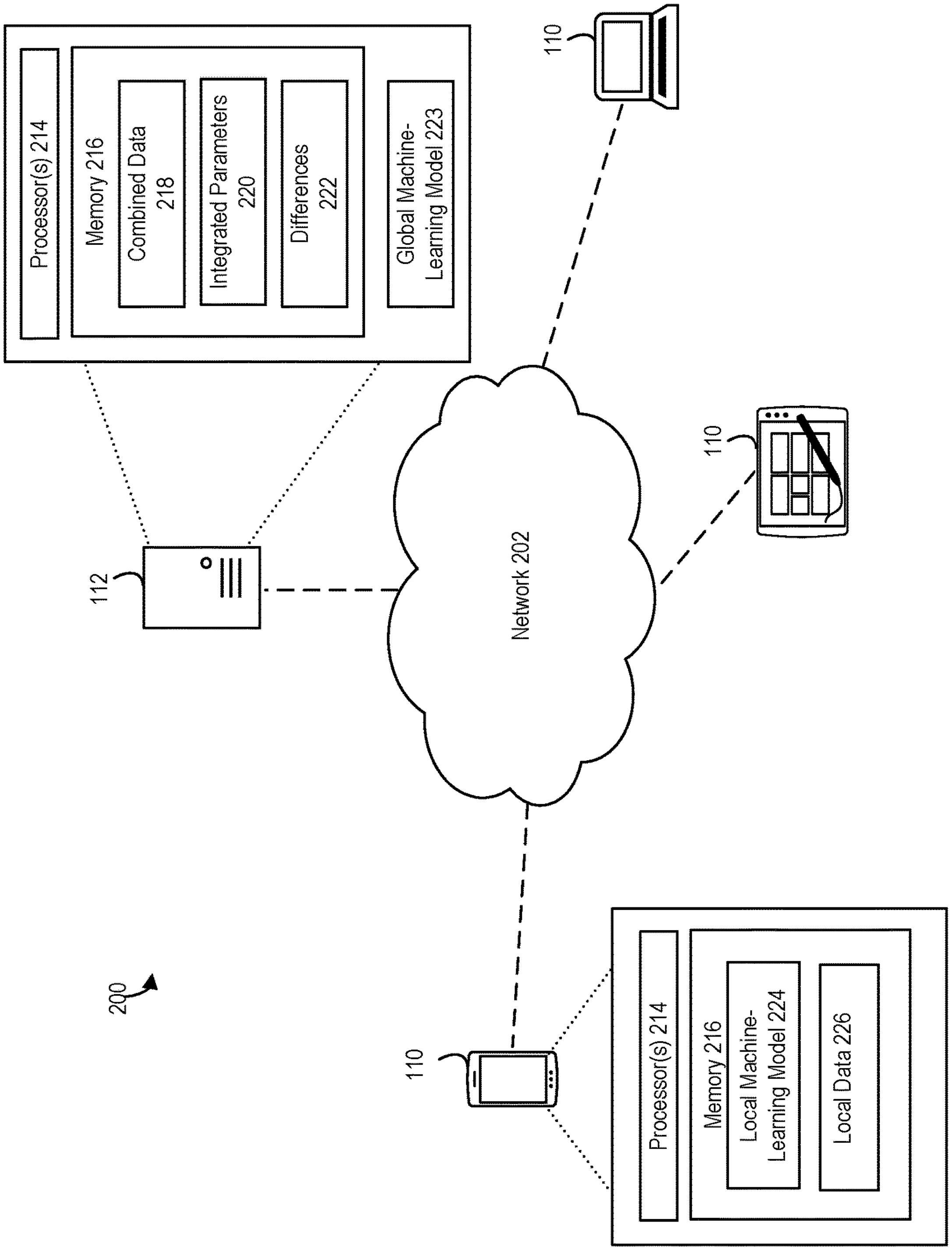
FIG. 2 illustrates an example system that can be used to implement the methods and systems of the present disclosure.

FIG. 2 illustrates an example system that can be used to implement the methods and systems of the present disclosure. The federated learning system 200 uses a client-server architecture that includes one or more servers 112 that communicate with one or more client devices 110 over a network 202.

The federated learning system 200, which is one embodiment of the system 100 in FIG. 1, includes a server 112, such as a web server. In one embodiment, the server 112 may be implemented using a processor 214 and memory 216. The server 112 can also include a network interface (not shown) used to communicate with the one or more client devices 110 over the network 202. The network interface can include any suitable components for interfacing with one more networks 202, including for example, transmitters, receivers, ports, controllers, antennas, or other suitable components.

The processor 214 can include any suitable processing device, such as a microprocessor, microcontroller, integrated circuit, logic device, or other suitable processing device. It is appreciated that more than one processor may be included in the server 112. The memory 216 may be computer-readable media, including, but not limited to, non-transitory computer-readable media, random access memory (RAM), read-only memory (ROM), hard drives, flash drives, or other memory devices. The memory 216 can store information accessible by the processor 214, including computer-readable instructions that can be executed by the processor 214. It is appreciated that more than one memory or memory device may be used in the server 112.

The instructions stored in the memory 216 can be any set of instructions that when executed by the processor 214, cause the processors 214 to perform operations. For example, on the client side, the instructions can be executed by the processor 214 to calculate backpropagation parameters. On the server side, the instructions can be executed by the processor 214 to calculate integrated parameters and parameter differences based on local data received from the client devices 110. In one embodiment, a parameter difference can be a number, a vector, a set of parameters, etc. in one embodiment, the memory 216 can also store data that can be retrieved, manipulated, created, or stored by the processors 214. The data can include, for instance, local data and updates from the client devices 110. In one embodiment, the local data and/or updates are combined or integrated and stored as combined data 218. In one instance, the combined data is a set of local parameters received from each of the client devices 110. For example, the sum or combination of local updates from multiple client devices 110 for a particular round of training can be stored temporarily. As additional rounds of training at the client device 110 are processed by local machine-learning models 109, further local updates are received and stored in the memory 216. The received updates may be continually updated until processing is completed. The combined data 218 may also be processed to calculate integrated parameters 220 and determine the difference 222 between integrated parameters and local parameter information sent from the client devices 110, as explained further below. In a further embodiment, the memory 216 may also store a global machine-learning model 223. The global machine-learning model 223 may be configured to receive local data from the client devices 110, combine the data and update the global model based on the local updates.

Although the depicted embodiment shows memory 216, it is appreciated that the data may also be stored in one or more databases (at the same or different locations). In one instance, the one or more databases can be connected to the server 112 by a high bandwidth local area network (LAN) or wide area network (WAN), or can also be connected to server 112 through network 202.

The server 112 can exchange data with the client devices 110 over the network 202. Any number of client devices 110 can be connected to the server 112 over the network 202. In one embodiment, a subset of the client devices 110 are connected or in communication with the server 112. The subset can comprise one or more of the client devices 110, including up to all of the devices of the multiple client devices 110. Each of the client devices 110 can be any suitable type of computing device, such as a general purpose computer, special purpose computer, laptop, desktop, mobile device, navigation system, smartphone, tablet, wearable computing device, gaming console, a display with one or more processors, or other suitable computing device.

Each of the client devices 110 may include one or more processor(s) 214 and a memory 216, similar to server 112. The processor 214 can additionally include, for example, one or more central processing units (CPUs), graphics processing units (GPUs) dedicated to efficiently rendering images or performing other specialized calculations, and/or other processing devices. The memory 216 can include one or more computer-readable media and can store information accessible by the one or more processors 214, including instructions that can be executed by the one or more processors 214 and data 226.

The instructions can include instructions for the processor 214 to implement a local machine-learning model 224 configured to determine one or more local updates. For example, the processor 214 can perform one or more training techniques such as, for example, backwards propagation of errors (or backpropagation), stochastic gradient descent, or other training techniques to re-train or otherwise update the model based on the locally stored data 226 (or training data). In one embodiment, an application may be executed by the processor 214 in order to perform the training on the data. In another embodiment, the training techniques may be included as part of the operation system of the client device 110.

Local data 226 may also be stored in memory 216 of the client devices 110. The local data can include one or more training data examples to be used in solving one or more optimization problems. In some embodiments, the training data examples of each client device 110 can be distributed unevenly among the client devices, such that no client device 110 includes a representative sample of the overall distribution of the training data examples.

The local data 226 can further include parameters or updated parameters to be communicated to the server 112. For example, the client device 110 may send parameters of the local machine-learning model 109 to the server 112. In some implementations, the client device 110 can receive integrated parameters from the server 112 that are used to train the local machine-learning model 109. The integrated parameters are calculated at the server 112 based on information received from the client devices 110. In further embodiments, the client device 110 also receives different information from the server 112, which information represents the difference between the integrated parameters and local parameters of the client device 110.

For example, in some implementations, a client device 110 can receive Integrated parameters (explained below) from the server 112, train the local machine-learned model 109 based at least in part on the local dataset to generate updated local values for sending back to the server 112, and generate diversified parameters based on the received integrated parameters and the parameter difference. In some implementations, the local update can be expressed in a vector, a matrix, or other suitable format.

In one embodiment, the client device 110 can include various input/output devices for providing and receiving information from a user, such as a touch screen, touch pad, data entry keys, speakers, and/or a microphone suitable for voice recognition. The client device 110 can also include a network interface used to communicate with server 112 over the network 202. The network interface can include any suitable components for interfacing with one more networks, including for example, transmitters, receivers, ports, controllers, antennas, or other suitable components.

The network 202 can be any type of communications network, such as a local area network (e.g., intranet), wide area network (e.g., Internet), cellular network, or some combination thereof. The network 202 can also include a direct connection between a client device 110 and the server 112. In general, communication between the server 112 and a client device 110 can be carried via network interface using any type of wired and/or wireless connection, using a variety of communication protocols (e.g., Transmission Control Protocol/Internet Protocol (TCP/IP), Hypertext Transfer Protocol (HTTP), Simple Mail Transfer Protocol (SMTP), File Transfer Protocol (FTP)), encodings or formats (e.g., HyperText Markup Language (HTML), Extensible Markup Language (XML)), and/or protection schemes (e.g., Virtual Private Network (VPN), secure HTTP, Secure Sockets Layer (SSL)).

Figure 3:
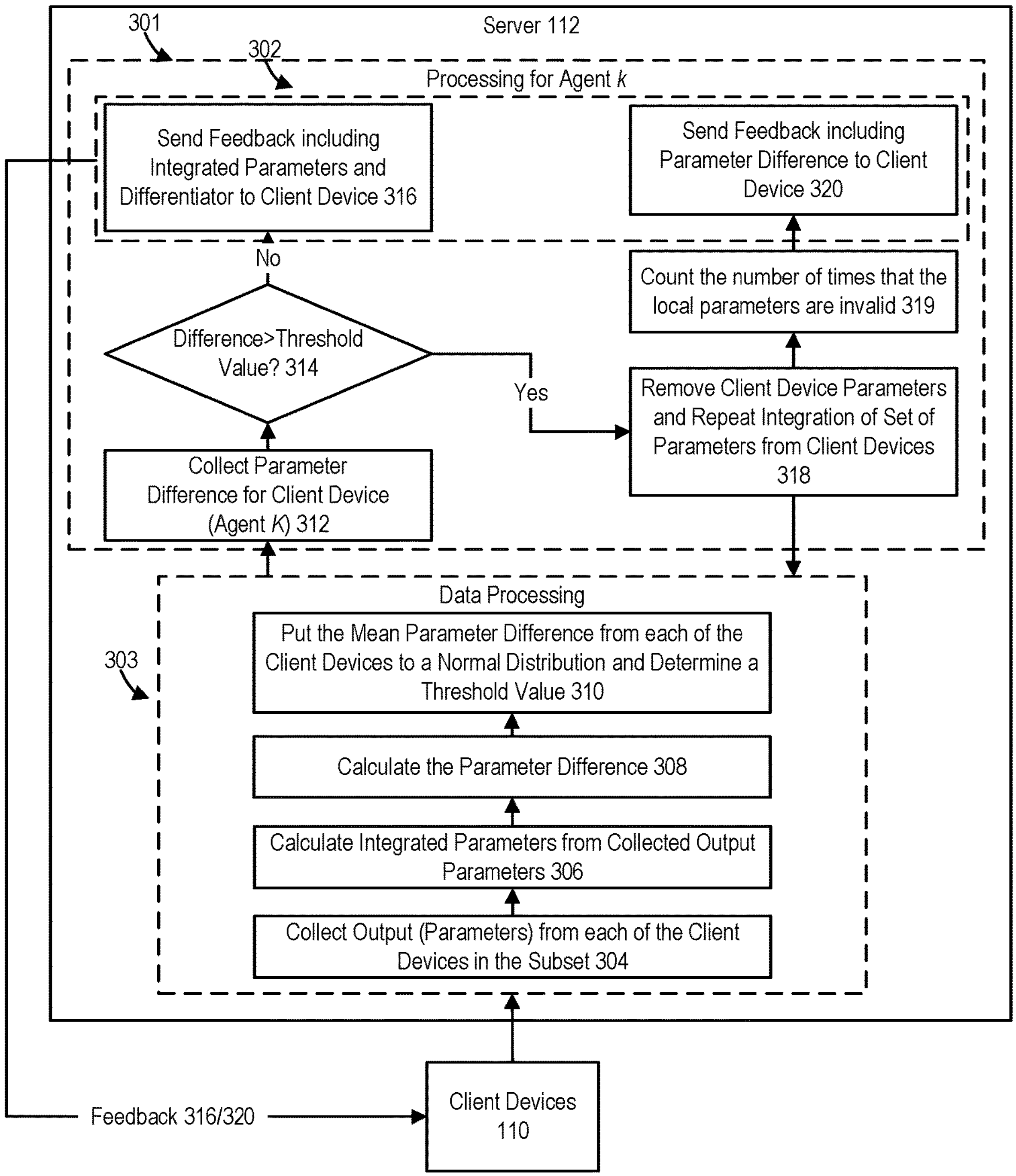
FIG. 3 illustrates an example flow diagram of a server processing information from client devices.

FIG. 3 is an example flow diagram of a server that is processing information from client devices. In embodiments, the flow diagrams may be computer-implemented methods performed, at least partly, by hardware and/or software components illustrated in the various figures and as described herein. In one embodiment, the disclosed process may be performed by the server 112 disclosed in FIGS. 1 and 2. In one embodiment, software components executed by one or more processors, such as processor(s) 214 or processor 604, perform at least a portion of the process.

In general, during federated learning, eligible client devices, such as client devices 110, check-in with a remote server, such as server 112. The server 112 then processes information from the client devices 110 during several rounds or iterations. In each round, the server 112 may select a subset of the client devices 110 to participate in training. The selected client devices 110 (subset of multiple client devices) first download the most recent global machine-learning model from the server 112, train a local machine-learning model based on local datasets at the client device 110, and report back model updates to the server 112 for aggregation while leaving the training data on the client device 110.

In conventional federated learning techniques, in which a synchronous update scheme that proceeds in rounds of communication is assumed, there may be K client devices. The $k^{th}$ device has $n_k$ training samples and $$n=\Sigma_{k=1}^{K} n_k$$

is the total number of samples. In general, the overall training objective is to minimize the loss function, which is represented as:

$$\mathcal{L}=\min_{W}\mathcal{F}(W) \tag{1}$$

In the above equation, F is an objective function (or cost function) and W represents the parameters that minimize the cost function. Using this technique, at iteration t, $W^{(t)}$ may be calculated as the weighted average of weights collected from each client device, such that:

$$W^{(t)}=\sum_{k=1}^{K}\frac{n^k}{n}w_k^{(t)} \tag{2}$$

After the server has collected updates from all K client devices in iteration t, the server performs the federated averaging algorithm (FEDAVG) to update the global machine-learning model. Results may then be backpropagated to each of the client devices.

However, existing federated learning methods have not solved the challenges posed by heterogenous local datasets. Since different users have different device usage patterns, the dataset samples and labels collected and stored on an individual client device may follow a different distribution. In such a case, the performance of federated learning, and in particular the FEDAVG, may significantly degrade in terms of the model accuracy and the communication rounds required for convergence of the training. More specifically, the FEDAVG averages all model weights of client devices to update a global model at a remote server. The client devices have local datasets that may not reflect the true data distribution in a global view, which inevitably incurs noise and bias to global model updates. Moreover, the models locally trained on local datasets can be significantly different from one another. Aggregating these divergent models can slow down convergence and substantially reduce the model accuracy.

Embodiments of the federated learning system 200 provide a mechanism in which to address the diverse amounts of local data (e.g., training data) that are collected at individual client devices 110, while maintaining the privacy of the data. Through this mechanism, the effect of data divergence is minimized and the number of rounds or iterations to achieve convergence of the data is reduced (convergence is accelerated). In general, to prevent training bias from occurring, the training data for a same target should be diversified. In this context, a target can be any type of object that a machine learning model is designed to detect, such as human eyes. For example, if the machine learning model is designed to detect eyes from human faces, the training data should include different kinds of human faces. However, within the context of this disclosure, diverse data (or diversified data) refers to data diverging from the target that a model is trained for. Using the above example, the data may have a cat face, or a dog face, which will become noise to the model and affect convergence.

In one embodiment, parameters (also referred to herein as a set of parameters) of a local machine-learning model collected at each client device 110 are sent to server 112. The collected parameters are then integrated or combined (or aggregated) into an integrated set of parameters (or public set of parameters). Based on the integrated set of parameters, feedback may be sent to the client devices 110. In another embodiment, the server 112 may determine whether specific client devices 110 are outliers and remove them from further processing. In still another embodiment, the feedback provides compensation to the client devices 110 to reduce the diversification of data.

As illustrated in the depicted embodiment, the server 112 processes information received from the client devices 110 (or subset of client devices) and sends feedback to the client devices 110 after processing the information. Processing of the information by the server 112 is broken into two phases data processing at block 303 and processing for clients (agent k at block 301, as an example). For purposes of this disclosure, that the terms agent and client (or client device) are synonymous.

In one embodiment, the data processing at block 303 includes the server 112 collecting parameters output by each of the client devices 110, calculating an Integrated set of parameters 220 from the collected parameters, calculating parameter differences 222, putting the mean parameter difference from each client device 110 to a normal distribution and determining a target or threshold value. A normal distribution within the context of this disclosure refers to a Gaussian distribution with mean and variance, where the mean can be non-zero. In a further embodiment, the server 112 processes data in "processing for agent k" block 301. That is, the server 112 processes data for each client device 110 (i.e., agent k) based on the information processed in data processing block 303. Processing for each client device 110 generally includes collecting the parameter difference for the specific client device 110 calculated in the data process at block 303, removing parameters of the client device 110 when target or threshold values are not met (i.e., the parameters do not fall within an expected range) and removing the parameters of the client device 110 when they fall outside of the expected range. Upon completion of processing at blocks 301 and 303, feedback is sent to the client devices 110 at block 302. Processing in blocks 301, 302, and 303 at the server 112 is explained in more detail as follows.

At step 304, the server 112 collects data (e.g., local parameter data 226) output from client devices 110. In one embodiment, the client devices 110 are a subset of all client devices 110 in the system 200. In one embodiment, the subset of client devices 110 may be randomly selected. The data output by the client devices 110, and collected by the server 112, include parameters determined as a result of training a local machine-learning model 109. The local machine-learning model 109 may be trained, for example, with local training data collected by and stored at each client device 110. Data collection at the client devices 110, and training of local machine-learning models 109, is discussed in more detail below with reference to FIGS. 4A and 4B.

As local parameter data 226 is collected and received at the server 112, the local parameter data 226 of each client device 110 is combined or aggregated into an integrated set of parameters (or public parameters) at step 306. In one embodiment, the integrated set of parameters is an aggregation of all local parameter data received by the server 112. Accordingly, the integrated set of parameters includes a diverse set of data that is collected from a variety of different client devices 110. The integrated set of parameters collected from the client devices 110 at iteration t may be represented by $W^{(t)}$, such that $W^{(t)} = \mathcal{W}$ $$\left(w_1^{(t)}, \ldots, w_K^{(t)}\right),$$

where $\mathcal{W}$ is an integration function. Stated differently, if $n_1 = n_2 = \ldots = n_k$, W at iteration t is defined as $$W = \mathcal{W}\left(w_1^{(t)}, \ldots, w_K^{(t)}\right) = \frac{1}{K}\sum_{k=1}^{K} w_k^{(t)}.$$

The integrated set of parameters provides a grouping (or combination or aggregation) of client device 110 local parameter data.

At step 308, the server 112 calculates the parameter difference 222 as the difference between the integrated set of parameters 220 calculated at step 306 and the set of parameters for each of the individual client devices 110 (Agent k) collected In step 304. That is, for each of client devices 110 in the subset of network client devices, a parameter difference 222 is calculated by the server 112. In one embodiment, the parameter difference 222 between the integrated set of parameters 220 and the parameters of each client device 110 (Agent k), is defined as $$d_k^{(t)} = \left\|W^{(t)} - w_k^{(t)}\right\|,$$

where $$d_k^{(t)}$$

is the parameter difference 222 and $W^{(t)}$ is the integrated set of parameters 220. According to this definition, the "$\| \|$" is an element-wise average (mean) of the difference. The variance between the integrated set of parameters and the parameters is defined as $$v_k^{(t)} = \|(W^{(t)} - w_k^{(t)})^2\|.$$

A mean of the parameter difference 222 calculated by the server 112 for each of the client devices 110 is then put to a normal distribution at step 310 based on a Central Limit Theorem (CLT). The CLT establishes that when you have a population with a mean and standard deviation, and sufficiently large random samples are taken from the population with replacement, the distribution of the sample means will be approximately normally distributed. In this case, assuming there are a sufficient number of clients, the parameter differences 222 follow a normal distribution of $$d_k^{(t)}$$

$\sim \mathcal{N}(0, DV^{(t)})$, where $$DV^{(t)} = \|(d_k^{(t)} - 0)^2\| = \|v_k^{(t)}\|.$$

A target or threshold value is then determined at step 310 based on $DV^{(t)}$.

At block 301, where the server 112 processes data for each client device 110, the calculated parameter differences 222 corresponding to each client device 110 are collected. The collected parameter differences 222 will then be used for continued processing at step 312. After collecting the parameter differences 222 for each client device 110, the parameter differences 222 for each client device 110 are compared to a threshold (or target) value at step 314. In statistics, the chance of a value falling beyond $|6\sigma|$ is low in a Gaussian distribution. Thus, the $|6\sigma|$ rule has been used in finding outliers. The threshold value is calculated using a normal distribution based on the CLT, where the threshold value 'σ' is determined as $\sigma = \sqrt{DV^{(t)}}$. If the difference is within $|6\sigma|$, or $$-6\sigma \leq d_k^{(t)} \leq 6\sigma,$$

then the parameters of a client device 110 will be counted as valid.

In one embodiment, the parameter difference 222 is compared to the threshold value by the server 112. When the comparison results in the parameter difference 222 being greater than the threshold value at step 314 (for a specific client device 110), the server 112 removes the set of parameters collected from the client device 110 from further calculation (during current iteration t) at step 318. In a further embodiment, after removal of the set of parameters for the current iteration t, the integrated set of parameters calculated at step 306 are returned to the data processing block 303 of server 112 to conduct another round of parameter processing. In a further embodiment, the number of times that the parameters are invalid is counted at step 319. In one embodiment, when the parameter difference is invalid, the local parameters are also invalid. In still a further embodiment, after removal of the set of parameters for the current iteration t, feedback is sent from the server 112 back to the client device 110 at step 320. The feedback includes at least the parameter differences 222 and the threshold value 310 calculated at step 308. As discussed further below, the feedback from block 302 provided to the client device 110 may then be used to update (backpropagate) the local data 226 (e.g., local parameters) of the local machine-learning model 109 of the client device 110.

In another embodiment, at step 314, comparison of the parameter difference 222 to the threshold value by, the server 112 results in the parameter difference 222 being less than or equal to the threshold value (for a specific client device 110). In this case, the feedback sent back from the server 112 to the client device 110 includes the integrated set of parameters 220 ($W^{(t)}$) calculated at step 306, the normal distribution ($\mathcal{N}$) of the parameter differences 222

$$(d_k^{(t)})$$

(i.e., a differentiator) and the parameter differences 222 determined at step 310. Similar to the above, the feedback from block 302 provided to the client device 110 may then be used to update (backpropagate) the local data 226 (e.g., local parameters) of the local machine-learning model 109 of the client device 110.

Figure 4A:
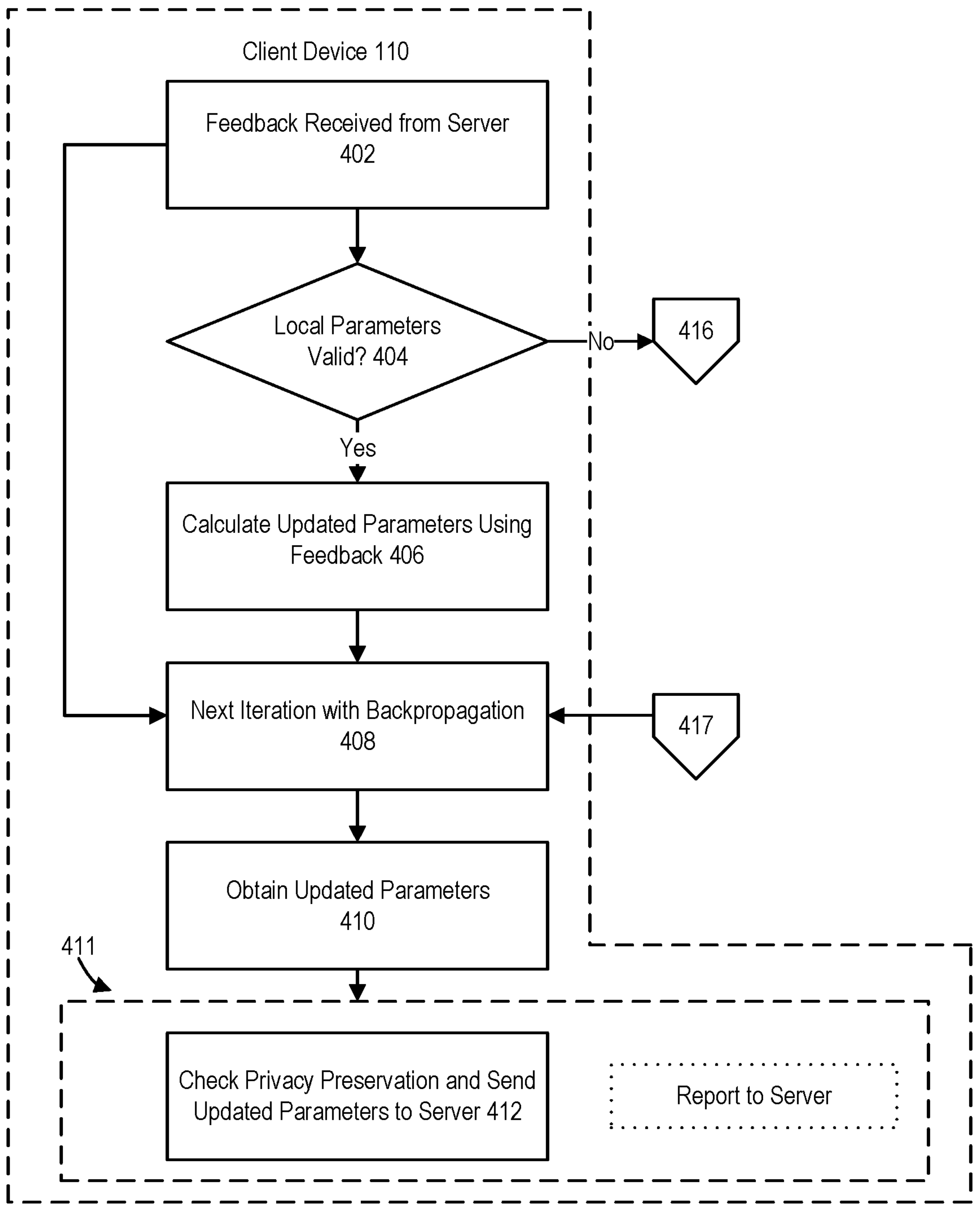
FIGS. 4A and 4B illustrate example flow diagrams of a client device processing information from a server.
Figure 4B:
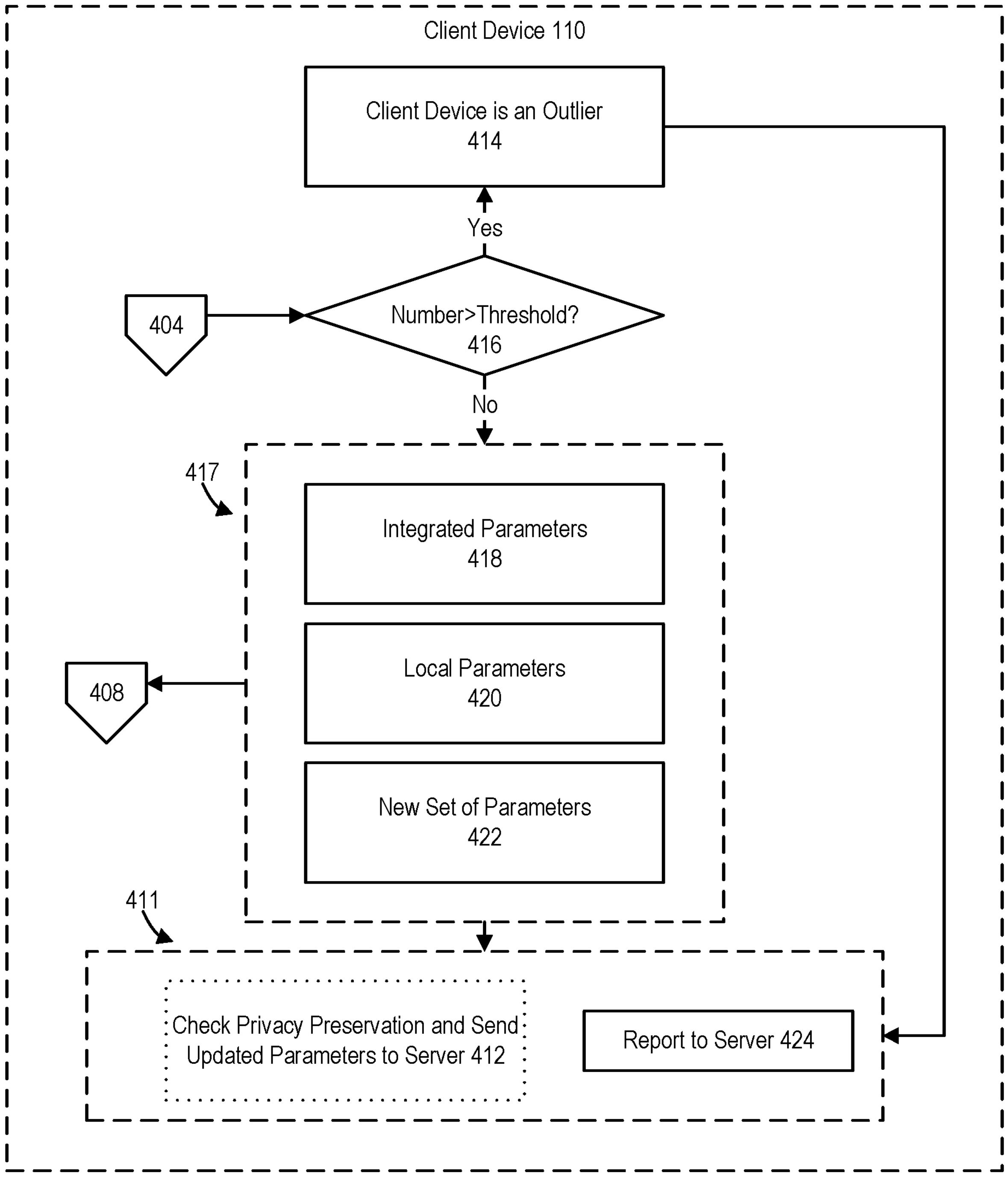

FIGS. 4A and 4B illustrate example flow diagrams of a client device processing information from a server. In embodiments, the flow diagrams may be computer-implemented methods performed, at least partly, by, hardware and/or software components illustrated in the various figures and as described herein. In one embodiment, the disclosed process may be performed by the client device 110 disclosed in FIGS. 1 and 2. In one embodiment, software components executed by one or more processors, such as processor(s) 214 or processor 604, perform at least a portion of the process.

In FIG. 4A, the feedback sent from the server 112 from block 302 is received at the client device 110 at step 402. In one embodiment, the feedback includes the integrated set of parameters 220 ($W^{(t)}$) calculated at step 306, the normal distribution ($\mathcal{N}$ of the parameter differences 222

$$(d_k^{(t)})$$

(i.e., a differentiator) and the parameter differences 222 output by the server 112 at block 302.

A step 404, the client device 110 determines whether the local parameters 226 (sent to the server 112 in the prior iteration) are valid or invalid based on the feedback received from the server 112. The local parameters 226 are invalid when the received feedback includes the parameter differences 222 without the integrated parameters 220, as shown in step 320 (FIG. 3). That is, when the comparison of the parameter difference 222 to the threshold value by the server 112 results in the parameter difference 222 being greater than the threshold value at step 314 (FIG. 3), the local parameters 226 are invalid and the process proceeds to step 416 (discussed below with reference to FIG. 4B). In one embodiment, the number of times the parameter difference 22 is greater than the threshold is counted. The number may then be used during processing to determine whether the local parameters, and therefore the client device 110, is an outlier, as discussed below.

In a further embodiment, the local parameters are valid when the received feedback from the server 112 includes at least the integrated parameters 220 and the parameter difference 222. That is, when a comparison of the parameter difference 222 to the threshold value by the server 112 results in the parameter difference 222 being less than or equal to the threshold value at step 314 (FIG. 3), the local parameters are valid and the process continues to step 406.

At step 406, the client device 110 calculates an updated set of parameters (also termed herein "diversified parameters") using the feedback received from the server 112. In one embodiment, the diversified parameters are calculated as the integrated set of parameters and the parameter difference. Specifically, the calculation is based on the integrated set of parameters 220 ($W^{(t)}$) and the parameter differences 222

$$(d_k^{(t)})$$

sent as part of the feedback from the server 112. In one embodiment, the diversified parameter $$w_k^{(t)}$$

(which will be used for backpropagation) will be calculated as an adjustment made to the integrated set of parameters ($W^{(t)}$) using a normal (Gaussian) distribution. In this case, the diversified parameters $$(w_k^{(t)})$$

may be calculated according to the equation:

$$w_k^{(t)} + W^{(t)} + \mathcal{N}\left(\frac{1}{\alpha}d_k^{(t)}, \frac{1}{\alpha^2}v_k^{(t)}\right),$$

where α is a parameter of positive integer. In terms of mean and variation, this normal distribution is proportional to the difference between the integrated parameters 222 and the local parameters 226 of the client device 110. In this case, the larger the α, the closer the diversified parameters are to the local parameter of the client device 110. The diversified parameter may then be used during backpropagation in the next iteration to calculate updated parameters of the local machine-learning model 109 for the client device 110.

At step 408, the local machine-learning model 109 is trained via backpropagation using the feedback received from server 112 and the diversified parameters calculated in step 406. In one embodiment, additional parameters from block 417 (FIG. 4B) may be used to train the local machine-learning model 109, as discussed below.

Backpropagation employs algorithms which are used to alter the parameters (or weights) of a machine-learning model. More specifically, backpropagation involves using a stochastic gradient descent (SGD) to minimize or otherwise reduce a pre-determined cost function. Through forward propagation, the learning model obtains a result based on current parameters, and this result will be compared with a target result. The difference, or error, between the result in the current iteration and the target result will be sent back to the learning model by backpropagation, so the parameters can be adjusted. Then, the updated local parameters are obtained for the local machine-learning model 109 at step 410. Learning iterations can be stopped if the error does not improve after a predetermined number of iterations. If error improves, iterations can continue until the error stabilizes.

In block 411, and before sending the updated local parameters back to the server 112, the updated local parameter information is checked to determine whether the privacy of information contained therein has been preserved at step 412. The updated local parameters may then be sent to the server 112 for continued processing.

Turning to FIG. 4B, when the comparison of the parameter differences 222 to the threshold value by the server 112 at step 404 (FIG. 4A) results in the parameter difference 222 being greater than the threshold value, the local parameters are invalid. The process proceeds to step 416 to determine whether the number of times the parameter difference 222 is invalid is greater than an empirical threshold value ($n^{thr}$). The number of times the parameter difference 222 is invalid is counted by the sever 112 during processing (step 319 of FIG. 3). When the number is greater than the threshold value, the client device 110 is determined to be an outlier and the client device 110 is removed from the subset of client devices 110 in the network. This determination is reported to the server 112 at block 411.

In another embodiment, when the number is less than or equal to the threshold value, processing at the client device 110 proceeds to block 417. At block 417, parameters for the next iteration of training (backpropagation) are selected and reported to the server 112. In one embodiment, the client device 110 selects the integrated parameters 220 at step 418 for backpropagation at step 408. In another embodiment, the client device 110 selects the local set of parameters (e.g., local parameter data 226) at step 420 for backpropagation at step 408. In still another embodiment, the client device 110 selects a new set of local parameters at step 422 for backpropagation at step 408. The selected parameter is also reported back to the server 112 at step 424.

Figure 4C:
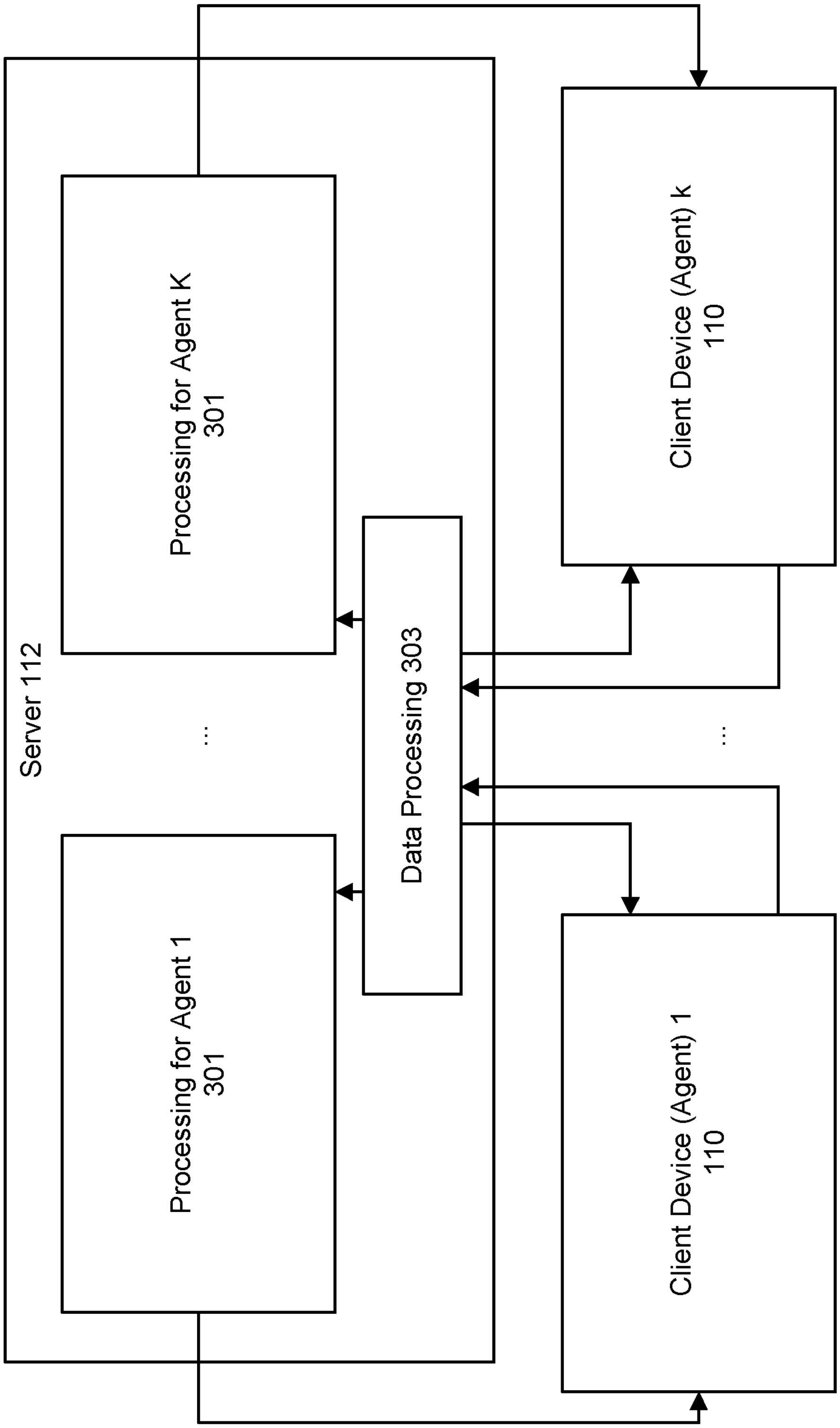
FIG. 4C illustrates an example of the server and client device processing system in accordance with FIGS. 3, 4A, and 4B.

FIG. 4C illustrates an example embodiment of the server and client device processing system in accordance with FIGS. 3, 4A, and 4B. In general, the processing system shows multiple client devices 110 being processed by a server 112, where each of the client devices 110 may be processed in parallel at the server 112, as shown by blocks 301. As illustrated, the processing system includes a server 112 that processes agents 1 to k (blocks 301) after processing data at block 303 from the client devices 110. The processing for agents 1 to k at block 301 and the data processing at block 303 are described above with respect to FIG. 3. It is also appreciated that more than one server 112 may be used to implement the processing system and the disclosure is not limited to a single server as depicted. The client devices 110 act in accordance with the description of FIGS. 4A and 4B provided above.

Figure 5:
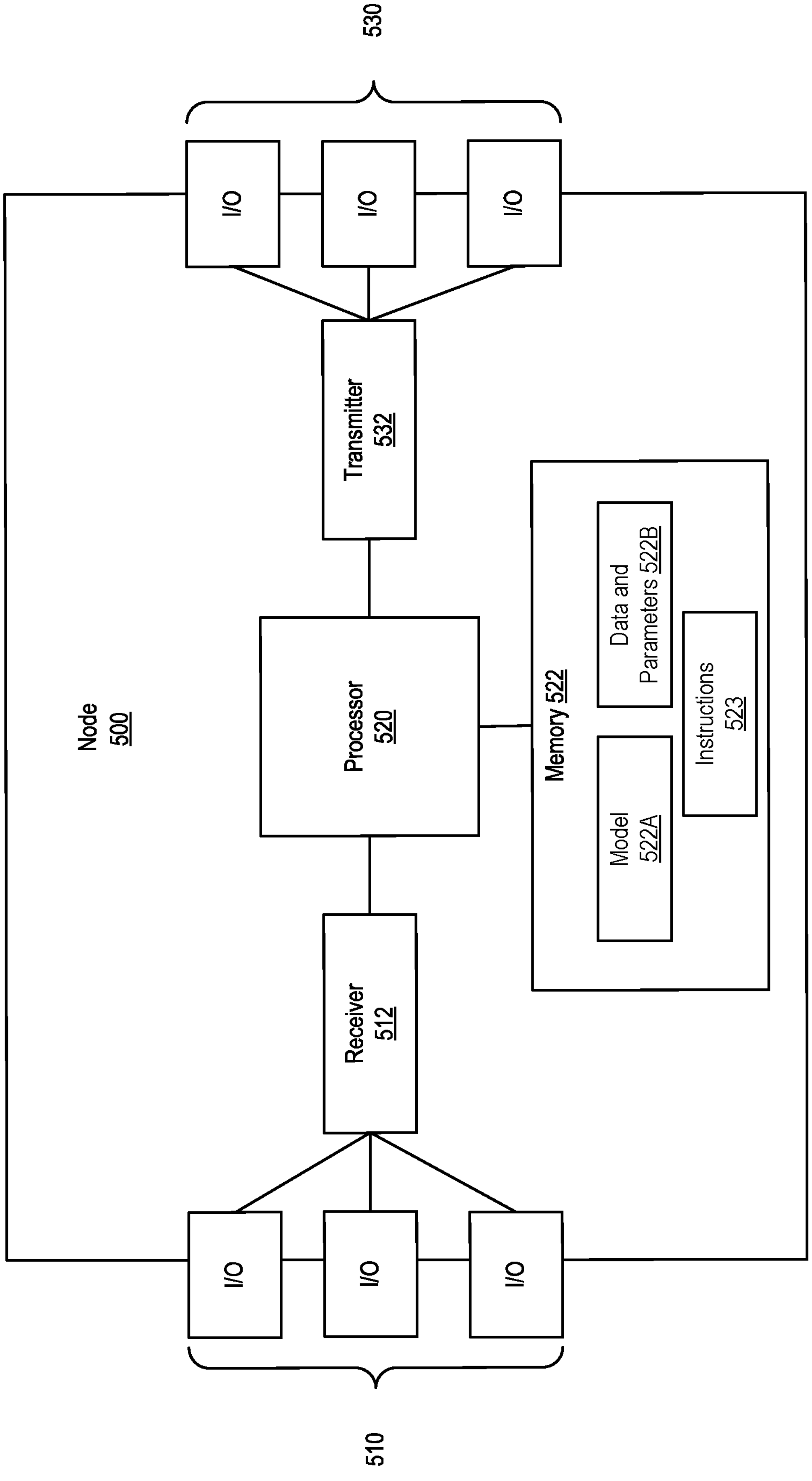
FIG. 5 illustrates an embodiment of a network node.

FIG. 5 illustrates an embodiment of a network node which may implement a router. The node (e.g., a client device or server) 500 may be, for example, a client device 110, a server 112 or any other network component as described above in system 100 or 200. The node 500 may comprise a plurality of input/output ports 510/530 and/or receivers (Rx) 512 and transmitters (Tx) 532 for receiving and transmitting data from other nodes, a processor 520 to process data and determine which node to send the data to and a memory 522. The node 500 may also generate and distribute data in the 8 form of data packets in the communication system.

Although illustrated as a single processor, the processor 520 is not so limited and may comprise multiple processors. The processor 520 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. Moreover, the processor 520 may be implemented using hardware, software, or both. The memory 522 may be configured to store a model 522A, data and parameters 522B, routing tables, forwarding tables, or other tables or information disclosed herein.

The memory 522 can also store instructions 523, wherein the processor 520 executes the instructions 523 to implement any of the operations disclosed herein, including federated learning operations. Alternatively, in other embodiments the instructions 523 can be stored in on-board memory (not shown) of the processor 520. Although illustrated as a single memory, memory 522 may be implemented as a combination of read only memory (ROM), random access memory (RAM), or secondary storage (e.g., one or more disk drives or tape drives used for non-volatile storage of data). The technology described above may also be implemented on any general-purpose network component, such as a computer or network component with sufficient processing power, memory resources, and network throughput capability to handle the necessary workload placed upon it.

Figure 6:
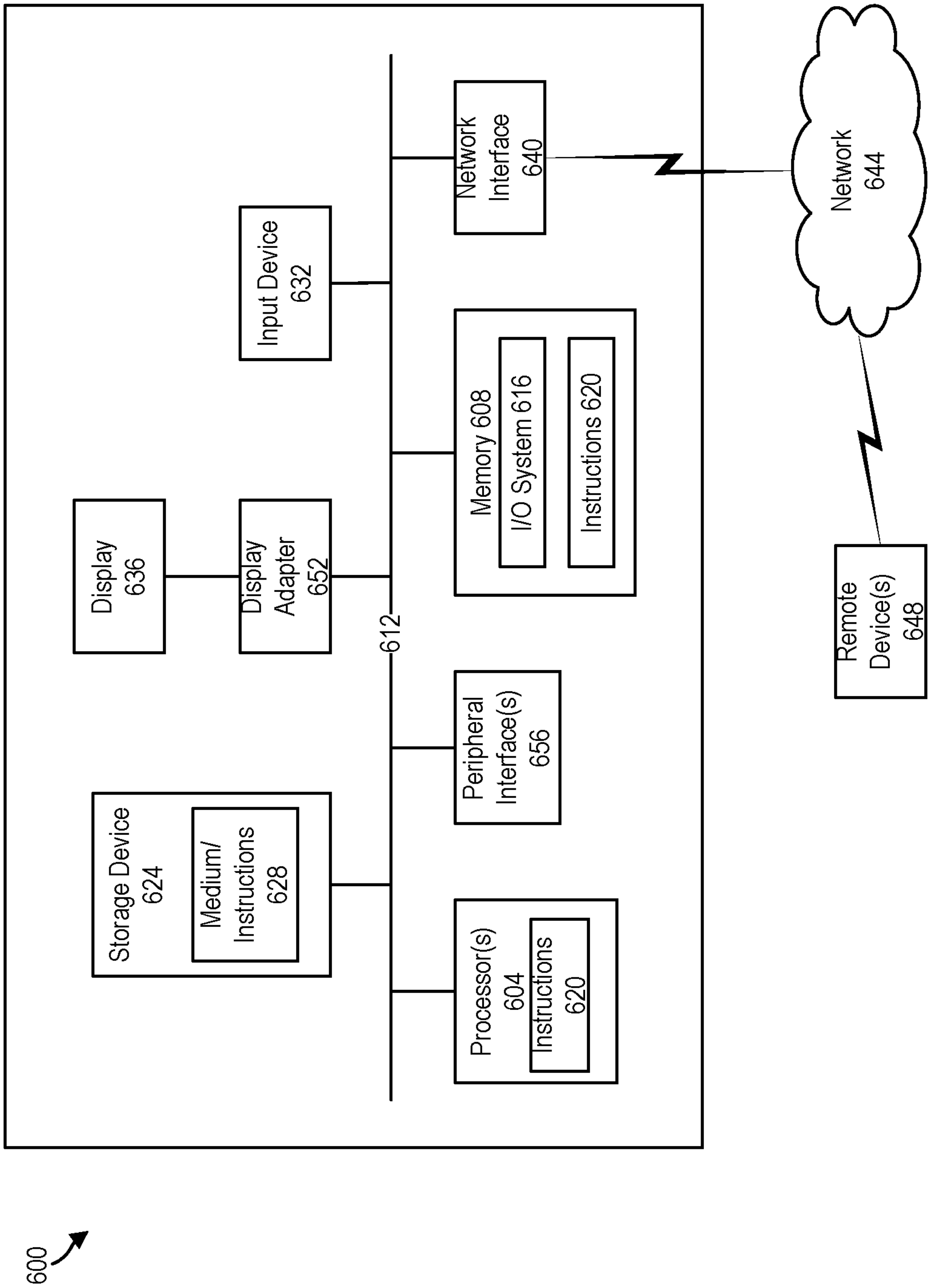
FIG. 6 is a diagram of a general-purpose network component or computer system.

FIG. 6 is a diagram of a computing system for implementing embodiments of the disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system (I/O) 616, including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example Interfaces include, but are not limited to. Small Computer System Interface (SCSI), advanced technology attachment (ATA), serial ATA, universal serial bus (USB), Institute of Electrical and Electronics Engineers (IEEE) 1394 (F REWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software or instructions 620 may reside, completely or partially, within machine-readable medium 628. In another example, instructions 620 may reside, completely or partially, within processor 604 and/or within the memory 608. It should be understood that instructions 620 may be the same as the instructions 523 of FIG. 5.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, instructions 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

Additional embodiments are provided in the clauses below.

Clause 1. A computer-implemented method for federated learning in a network including a server and multiple client devices, comprising: receiving, by a client device, feedback from the server, the feedback including at least one of an integrated set of parameters and a parameter difference, determining, by the client device, whether local parameters of the client device previously sent to the server are valid based on the received feedback; calculating, by the client device, a diversified set of parameters based on the integrated set of parameters, the parameter difference, and the local parameters when the local parameters are determined to be valid, training, by the client device, a local machine-learning model based on the feedback and the diversified set of parameters calculated by the client device when the local parameters are determined to be valid; retrieving, by the client device, updated local parameters from the trained local machine-learning model; and sending, by the client device, the updated local parameters to the server.

Clause 2. The computer-implemented method of clause 1, wherein when the local parameters are determined to be invalid, further comprising: selecting, by the client device, a parameter of the integrated parameters, the local parameters of the client device previously sent to the server, or a new set of parameters based on data collected by the client device; and training, by the client device, the local machine-learning model based on the feedback from the server and the selected parameter of the integrated parameters, the local parameters of the client device previously sent to the server, or the new set of parameters.

Clause 3. The computer-implemented method of clause 1, wherein when the local parameters are determined to be invalid, further comprising classifying the client device as an outlier.

Clause 4. The computer-implemented method of clause 1, further comprising calculating the diversified set of parameters based on the integrated set of parameters, the parameter difference, and the local parameters.

Clause 5. The computer-implemented method of clause 3, wherein the local parameters of the client device are determined to be valid when a difference between the integrated set of parameters and the local parameters of the client device previously sent to the server are less than or equal to a first threshold value; and the local parameters of the client device are determined to be invalid when a difference between the integrated set of parameters and the local parameters of the client device previously sent to the server are greater than a first threshold value.

Clause 5. The computer-implemented method of clause 4, further comprising identifying a number of times the parameter difference and the local parameters are invalid from the feedback sent by the server.

Clause 6. The computer-implemented method of clause 5, wherein when the number of times is greater than a second first threshold, further comprising setting the client device as an outlier.

Clause 7. The computer-implemented method of clause 1, where the integrated set of parameters received from the server includes a combination of local parameters from a subset of the multiple client devices; and the parameter difference is the difference between the integrated set of parameters and the local parameters from the client device previously sent to the server.

Clause 8. The computer-implemented method of clause 1, wherein the local parameters are collected by the client device.

Clause 9. A client device for federated learning in a network, comprising: a non-transitory memory storage comprising instructions; and one or more processors in communication with the memory, wherein the one or more processors execute the instructions to: receive feedback from a server in the network, the feedback including at least one of an integrated set of parameters and a parameter difference, determine whether local parameters of the client device previously sent to the server are valid based on the received feedback; calculate a diversified set of parameters based on the integrated set of parameters, the parameter difference, and the local parameters when the local parameters are determined to be valid; train a local machine-learning model based on the feedback and the diversified set of parameters calculated by the client device when the local parameters are determined to be valid; retrieve updated local parameters from the trained local machine-learning model; and send the updated local parameters to the server.

Clause 10. The client device of clause 9, wherein when the local parameters are determined to be invalid, wherein the one or more processors further execute the instructions to: select a parameter of the integrated parameters, the local parameters of the client device previously sent to the server, or a new set of parameters based on data collected by the client device; and train the local machine-learning model based on the feedback from the server and the selected parameter of the integrated parameters, the local parameters of the client device previously sent to the server, or the new set of parameters.

Clause 11. The client device of clause 9, wherein when the local parameters are determined to be invalid, further comprising classifying the client device as an outlier.

Clause 12. The client device of clause 9, wherein the one or more processors further execute the instructions to calculate the diversified set of parameters based on the integrated set of parameters, the parameter difference, and the local parameters.

Clause 13. The client device of clause 12, wherein the local parameters of the client device are determined to be valid when a difference between the integrated set of parameters and the local parameters of the client device previously sent to the server are less than or equal to a first threshold value; and the local parameters of the client device are determined to be invalid when a difference between the integrated set of parameters and the local parameters of the client device previously sent to the server are greater than a first threshold value.

Clause 14. The client device of clause 13, wherein the one or more processors further execute the instructions to a number of times the parameter difference and the local parameters are invalid from the feedback sent by the server.

Clause 15. The client device of clause 14, wherein when the number of times is greater than a second first threshold, wherein the one or more processors further execute the instructions to set the client device as an outlier.

Clause 16. The client device of clause 9, wherein the integrated set of parameters received from the server includes a combination of local parameters from the client device and a subset of other multiple client devices; and the parameter difference is the difference between the integrated set of parameters and the local parameters from the client device previously sent to the server.

Clause 17. The client device of clause 9, wherein the one or more processors further execute the instructions to collect the local parameters.

Clause 18. A non-transitory computer-readable medium storing computer instructions for federated learning in a network including a server and multiple client devices, that when executed by one or more processors, causes a client device to perform the steps of: receiving feedback from the server, the feedback including at least one of an integrated set of parameters and a parameter difference, determining whether local parameters of the client device previously sent to the server are valid based on the received feedback; calculating a diversified set of parameters based on the integrated set of parameters, the parameter difference, and the local parameters when the local parameters are determined to be valid: training a local machine-learning model based on the feedback and the diversified set of parameters calculated by the client device when the local parameters are determined to be valid; retrieving updated local parameters from the trained local machine-learning model; and sending the updated local parameters to the server.

Clause 19. The non-transitory computer-readable medium of clause 18, wherein when the local parameters are determined to be invalid, further causes the client device to perform the steps of: selecting a parameter of the integrated parameters, the local parameters of the client device previously sent to the server, or a new set of parameters based on data collected by the client device; and training the local machine-learning model based on the feedback from the server and the selected parameter of the integrated parameters, the local parameters of the client device previously sent to the server, or the new set of parameters.

Clause 20. The non-transitory computer-readable medium of clause 19, wherein when the local parameters are determined to be invalid, further causes the client device to perform the steps of classifying the client device as an outlier.

Clause 21. The non-transitory computer-readable medium of clause 19, further causes the client device to perform the steps of calculating the diversified set of parameters based on the integrated set of parameters, the parameter difference, and the local parameters.

Clause 22. The non-transitory computer-readable medium of clause 21, wherein the local parameters of the client device are determined to be valid when a difference between the integrated set of parameters and the local parameters of the client device previously sent to the server are less than or equal to a first threshold value; and the local parameters of the client device are determined to be invalid when a difference between the integrated set of parameters and the local parameters of the client device previously sent to the server are greater than a first threshold value.

Clause 23. The non-transitory computer-readable medium of clause 22, further causes the client device to perform the steps of identifying a number of times the parameter difference and the local parameters are invalid from the feedback sent by the server.

Clause 24. The non-transitory computer-readable medium of clause 23, wherein when the number of times is greater than a second first threshold, further causes the client device to perform the steps of setting the client device as an outlier.

Clause 25. The non-transitory computer-readable medium of clause 18, wherein the integrated set of parameters received from the server includes a combination of local parameters from a subset of the multiple client devices; and the parameter difference is the difference between the integrated set of parameters and the local parameters from the client device previously sent to the server.

Clause 26. The non-transitory computer-readable medium of clause 18, further causes the client device to perform the steps of collect the local parameters by the client device.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid-state storage media and specifically excludes signals. It should be understood that the software can be installed in and sod with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms “a”, “an” and “the” are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for federated learning in a network including a server and multiple client devices, comprising:

receiving, by the server, a set of parameters of a local machine-learning model from each client device in a subset of the multiple client devices;

combining, by the server, the set of parameters from each of the client devices in the subset to generate an integrated set of parameters;

calculating, by the server, a parameter difference between the integrated set of parameters and the set of parameters for each client device in the subset of the multiple client devices;

determining, by the server, whether the set of parameters from each of the client devices in the subset of multiple client devices are valid according to a Central Limit Theorem by calculating a first threshold value using a normal distribution based on the Central Limit Theorem and comparing the parameter difference to the first threshold value;

sending feedback to each client device in the subset of multiple client devices, the feedback being based on a comparison of the parameter difference of each client device in the subset of the multiple client devices to the first threshold value; and when the parameter difference is greater than the first threshold value:

recording, by the server, a number of times the parameter difference for each of the client devices in the subset is greater than the first threshold value;

sending, by the server, the parameter difference to each of the client devices in the subset;

removing, by the server, the set of parameters for each of the client devices in the subset when the number of times is greater than a second threshold value;

recalculating, by the server, the integrated set of parameters to generate a recalculated integrated set of parameters; and recalculating, by the server, a recalculated parameter difference between the recalculated integrated set of parameters and the set of parameters for each client device in the subset of the multiple client devices.

2. The computer-implemented method of claim 1, wherein removing the set of parameters for each of the client devices comprises removing the set of parameters collected from the client device from further calculation during a current iteration.

3. The computer-implemented method of claim 1, wherein the feedback includes the integrated set of parameters, a parameter difference normal distribution, and the parameter difference when the parameter difference is less than or equal to the first threshold value.

4. The computer-implemented method of claim 3, wherein the feedback is proportional to a standard deviation of the normal distribution.

5. The computer-implemented method of claim 1, further comprising:

setting, by the server, a particular client device as an outlier client device if the number of times is greater than the second threshold value; and removing, by the server, the outlier client device from the subset.

6. The computer-implemented method of claim 5, wherein the setting includes determining the outlier client device based on the normal distribution and the first threshold value.

7. The computer-implemented method of claim 1, further comprising:

storing a global machine-learning model at the server; and iteratively updating, by the server, the global machine-learning model based on the recalculated integrated set of parameters.

8. A server for federated learning in a network having multiple client devices, comprising:

a non-transitory memory storing instructions; and at least one processor in communication with the memory, the at least one processor configured, upon execution of the instructions, to perform the following steps:

receive a set of parameters of a local machine-learning model from each client device in a subset of the multiple client devices;

combine the set of parameters from each of the client devices in the subset to generate an integrated set of parameters;

calculate a parameter difference between the integrated set of parameters and the set of parameters for each client device in the subset of the multiple client devices; and determine whether the set of parameters from each of the client devices in the subset of multiple client devices are valid according to a Central Limit Theorem by calculating a first threshold value using a normal distribution based on the Central Limit Theorem and comparing the parameter difference to the first threshold value;

send feedback to each client device in the subset of multiple client devices, the feedback being based on a comparison of the parameter difference of each client device in the subset of the multiple client devices to the first threshold value; and when the parameter difference is greater than the first threshold value:

record a number of times the parameter difference for each of the client devices in the subset is greater than the first threshold value;

send the parameter difference to each of the client devices in the subset;

remove the set of parameters for each of the client devices in the subset when the number of times is greater than a second threshold value;

recalculate the integrated set of parameters to generate a recalculated integrated set of parameters; and recalculate a recalculated parameter difference between the recalculated integrated set of parameters and the set of parameters for each client device in the subset of the multiple client devices.

9. The server of claim 8, wherein removing the set of parameters for each of the client devices comprises removing the set of parameters collected from the client device from further calculation during a current iteration.

10. The server of claim 8, wherein the feedback includes the integrated set of parameters, a parameter difference normal distribution, and the parameter difference when the parameter difference is less than or equal to the first threshold value.

11. The server of claim 10, wherein the feedback is proportional to a standard deviation of the normal distribution.

12. The server of claim 8, wherein for each client device in the subset for which the number is greater than the second threshold value, the one or more processors further execute the instructions to:

set a particular client device as an outlier client device if the number of times is greater than the second threshold value; and remove the outlier client device from the subset.

13. The server of claim 12, wherein the one or more processors further execute the instructions to determine the outlier client device based on the normal distribution and the first threshold value.

14. The server of claim 8, the one or more processors further execute the instructions to:

store a global machine-learning model; and iteratively update the global machine-learning model based on the recalculated integrated set of parameters.

15. A non-transitory computer-readable media storing computer instructions for federated learning in a network including a server and multiple client devices, that configure at least one processor, upon execution of the instructions, to perform the following steps:

receiving a set of parameters of a local machine-learning model from each client device in a subset of the multiple client devices;

combining the set of parameters from each of the client devices in the subset to generate an integrated set of parameters;

calculating a parameter difference between the integrated set of parameters and the set of parameters for each client device in the subset of the multiple client devices;

determining whether the set of parameters from each of the client devices in the subset of multiple client devices are valid according to a Central Limit Theorem by calculating a first threshold value using a normal distribution based on the Central Limit Theorem and comparing the parameter difference to the first threshold value;

sending feedback to each client device in the subset of multiple client devices, the feedback being based on a comparison of the parameter difference of each client device in the subset of the multiple client devices to the first threshold value; and when the parameter difference is greater than the first threshold value:

record a number of times the parameter difference for each of the client devices in the subset is greater than the first threshold value;

send the parameter difference to each of the client devices in the subset;

remove the set of parameters for each of the client devices in the subset when the number of times is greater than a second threshold value;

recalculate the integrated set of parameters to generate a recalculated integrated set of parameters; and recalculate a recalculated parameter difference between the recalculated integrated set of parameters and the set of parameters for each client device in the subset of the multiple client devices.

16. The non-transitory computer-readable medium of claim 15, wherein removing the set of parameters for each of the client devices comprises removing the set of parameters collected from the client device from further calculation during a current iteration.

17. The non-transitory computer-readable medium of claim 15, wherein the feedback includes the integrated set of parameters, a parameter difference normal distribution, and the parameter difference when the parameter difference is less than or equal to the first threshold value.

18. The non-transitory computer-readable medium of claim 17, wherein the feedback is proportional to a standard deviation of the normal distribution.

19. The non-transitory computer-readable medium of claim 15, wherein for each client device in the subset for which the number is greater than the second threshold value, further causing the server to perform the steps of:

setting a particular client device as an outlier client device if the number of times is greater than the second threshold value; and removing the outlier client device from the subset.

20. The non-transitory computer-readable medium of claim 19, wherein the setting includes determining the outlier client device based on the normal distribution and the first threshold value.

21. The non-transitory computer-readable medium of claim 15, further causing the server to perform the steps of:

storing a global machine-learning model; and iteratively updating the global machine-learning model based on the set of parameters received from each of the client devices in the subset of the multiple client devices.

* * * * *